Dec. 22, 1953   H. B. COATS   2,663,089
DESOLVENTIZER VAPOR RECOVERY SYSTEM
Filed May 3, 1949
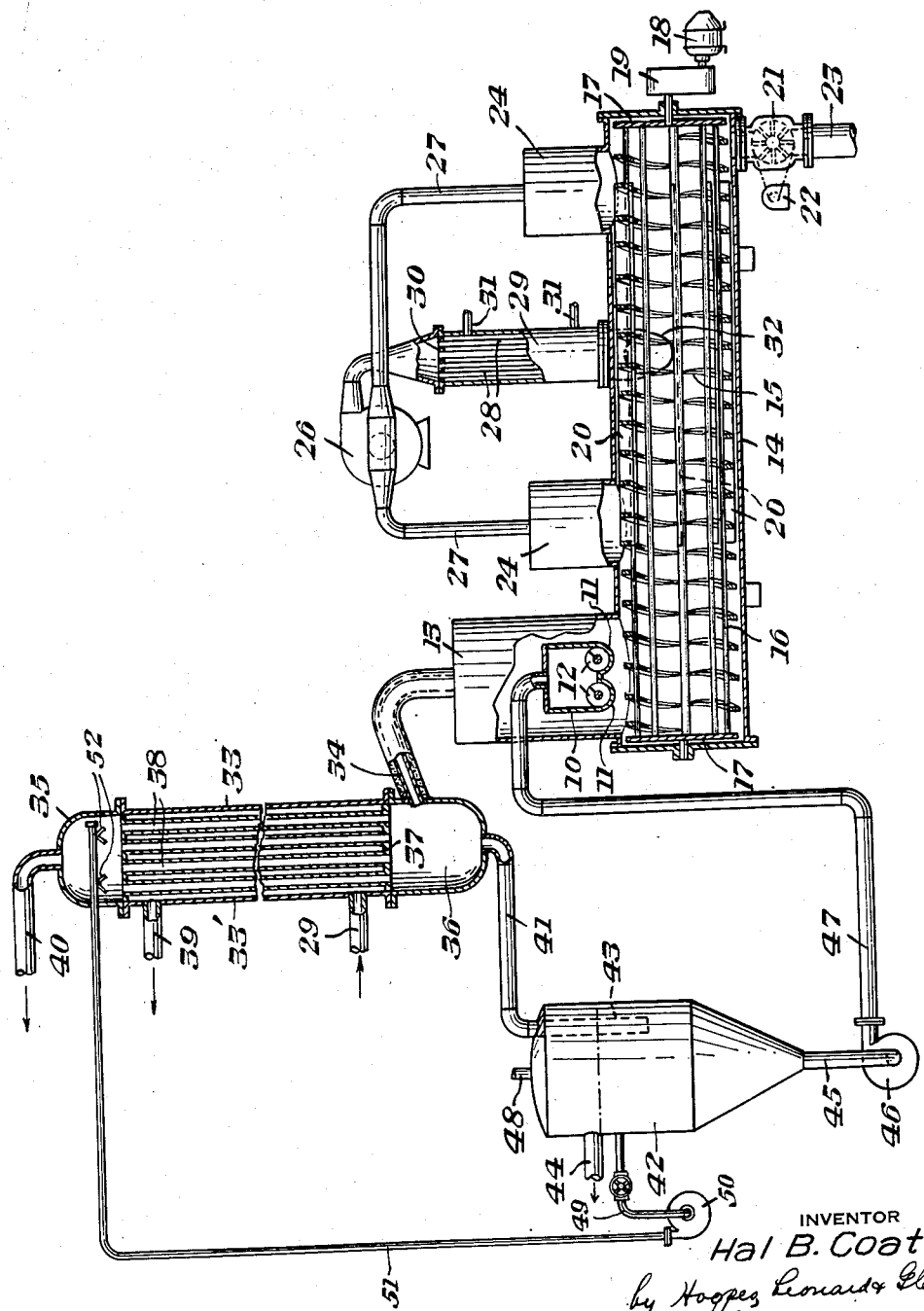
INVENTOR
Hal B. Coats
by Hoopes Leonard & Glenn
his attorneys Patented Dec. 22, 1953

2,663,089

UNITED STATES PATENT OFFICE 2,663,089

DESOLVENTIZER VAPOR RECOVERY SYSTEM

Hal B. Coats, Edgewood, Pa., assignor, by mesne assignments, to Blaw-Knox Company, Pittsburgh, Pa., a corporation of Delaware Application May 3, 1949, Serial No. 91,110

8 Claims. (Cl. 34—9)

This invention relates to a desolventizer system for use in conjunction with the solvent extraction of soluble materials from solid organic substances. More particularly, this invention relates to a desolventizer system in which the net vapors evolved in the desolventizing of residual solids from the solvent extraction are handled in a novel way.

This invention is generally applicable to diverse solvent extraction processes, especially those for extracting oils or the like from organic particles, using either water-immiscible solvents (e. g., hydrocarbons such as hexane) or water-miscible solvents (e. g., alcohols or the like). The particles treated may be either moisture-containing or substantially anhydrous particles. In such processes, one of the normal steps involves heating the extracted particles to remove, by evaporation, the residual solvent which is then condensed to liquid and recovered for further use in extraction. In this step, the evolved solvent vapors ordinarily contain entrained fines from the solid particles, which have caused serious difficulties wherever condensation occurs, particularly in the fouling of the condensing apparatus (which reduces its condensing capacity and renders frequent cleaning necessary) and the consequent yielding of dirty liquor which has had to be disposed of. In many of these processes, the fines so wasted consist of protein material which advantageously could be recovered.

In the extraction of soybean flakes or the like, using commercial hexane or other water-immiscible solvent, the flakes usually contain moisture, some of which is evaporated with the solvent in the desolventizer. On condensing such vapors, the liquids, water and solvent, separate in different phases and the fines generally accumulate in the aqueous phase, but being good emulsifying agents they make the separation of the aqueous and solvent phases more difficult. When separated, the water and fines suspension has been most difficult to treat and dispose of. Approved practice requires the boiling of such waste water before passing it to sewers, to remove all trace of solvent; but the fines, approaching colloids, cause trouble in such handling. A specific object of this invention is to avoid the waste water problem in such processes.

Where oils and fats are extracted with alcohols, upon desolventizing and condensing the vapors, the liquid water and solvent being miscible, the liquor is clarified by settling and the fines removed in a solvent suspension, there being no aqueous phase. In such processes it is preferred to first dry the particles to substantially anhydrous state before extraction, and if this is done substantially no water vapors are produced in desolventizing. However, the suspension of fines in solvent in such processes has been even more difficult of disposal than the aqueous suspension above mentioned. By means of this invention this suspension of fines in solvent is handled substantially in the same manner as in the case where an aqueous condensation product is involved, thereby eliminating any disposal problem.

Thus, in the practice of this invention, means are provided for automatically maintaining all surfaces clean for condensing vapors evolved from solids desolventizers; and for avoiding any build-up of organic material thereon. In addition, provision is made for the recovery of fine particles, and the disposal, by return to the process, of aqueous or solvent liquid suspensions of such fine material which heretofore required disposal. These improvements markedly enhance the efficiency and economy of such systems. Other objects and advantages of this invention will be apparent from the following description and the single figure which is illustrative only in which is shown, in partial cross section, a preferred embodiment of the system of this invention.

Referring to the drawing, the system of this invention will first be described as particularly applied to the desolventizing of soybean flakes which have been extracted with commercial hexane, or other water-immiscible solvent. These extracted flakes are conveyed from the extractor to the solids desolventizer by any appropriate means.

Such a means might constitute an enclosed double screw conveyor 10 having two parallel semicircular troughs 11 at the bottom thereof in which conveyor screws 12 respectively turn in such manner as to feed such remaining solids from the extractor directly to an inlet dome 13 of a desolventizer 14. These flakes contain an appreciable amount of residual liquids in the form principally of solvent, some water and, dependent upon the extraction efficiency, some residual oil. Protein-rich fines originally from the organic particles are also present.

Desolventizer 14 may preferably be of the type more fully described in United States patent application Serial No. 737,915, filed March 28, 1947 in the name of Eugene H. Leslie, now Patent #2,571,143. It comprises in addition to inlet dome 13 a helical blade 15, the turns of which are supported by longitudinal bars 16. These bars are fastened at their ends within the desolventizer casing to end plates 17 suitably journaled in the desolventizer for rotation and movement of blade 15 in such fashion as to advance the remaining solids from the inlet end of desolventizer 14 to the solids outlet at the other end thereof. A motor 18 by means of a suitable transmission 19 turns the end plates 17 and hence the members connected thereto. Longitudinal scraper bars 20 are also affixed to the rotating portions of desolventizer 14 and cascade the solids being fed through the desolventizer so that excellent solid-vapor contact is obtained.

A rotary vane valve 21 is connected to the interior of solids desolventizer 14 at the bottom thereof and at the end opposite the location of inlet dome 13. As desolventized solids reach that end they fall between the vanes of valve 21 and in the course of rotation of the vanes thereof by a suitable motor 22, these desolventized solids fall out through a pipe 23. Pipe 23 may lead to a deodorizer from whence the desolventized and deodorized solids are usually treated to make up the finished solid product.

Residual solvent and some water in the flakes are evaporated as a consequence of the heating of vapors drawn into two vapor domes 24. These vapors pass into the intake of a fan 26 through ducts 27. In turn the vapors are forced through the tubes 28 of a heater 29. The tubes are mounted in tube sheets 30, the lower of which is not shown. Heating steam is passed to the space between the tube sheets around tubes 30 through the lines 31. The heated vapors re-enter the main body of desolventizer 14 directly below the lower tube sheet 30 where heater 29 is connected to a flanged opening 32 integral with desolventizer 14.

The vapors are given sufficient superheat by heater 29 to achieve effective desolventizing. As they pass through opening 32 the vapors divide and flow both countercurently, that is toward inlet dome 13, and concurrently, that is toward valve 21.

The net vapors evolved in desolventizer 14 exit through inlet dome 13 and pass into a condenser 33 through a line 34. These net vapors principally comprise solvent, water and some entrained protein-rich fines from the solid organic particles.

The condenser 33 comprises a vertical casing 33′, header 35 and a condensate reservoir 36. Tube sheets 37 intermediate the top and bottom of the condenser connect the interior of header 35 with condensate reservoir 36 by means of tubes 38. Process coolant, usually water, is passed through the interior spaces between tube sheets 37 and around tubes 38 through lines 39. Non-condensable gases, if present, pass out of header 35 through a line 40 under atmospheric pressure or under such draft as may be appropriate to the processing circumstances of a given operation.

The condensable portions of the net vapors flow down the condensing surfaces, interior surfaces of tubes 38, in a direction countercurrent to the flow of net vapors. Thereby the condensing surfaces are maintained clean and free of any deposit of fines or other solid material which would reduce the efficiency of condenser 33 and require its periodic cleaning. In addition, the countercurrent flow of the condensed liquids in some measure scrubs the net vapors. These condensed liquids, with solid fines in suspension, flow into condensate reservoir 36 and thence through a conduit 41 to a decanter 42. Duct 34 is also preferably arranged to drain any condensation which might occur when the duct is cool into the bowl 36 or the dome 13, as shown in the drawing.

Decanter 42 is of conventional character and has an inlet pipe 43 connected to conduit 41 and extending downwardly into the decanter beneath the level of an outlet 44. The lower end of decanter 42, at which settled solids and water are collected, is connected to a condensate outlet pipe 45 which leads to the intake of a pump 46. This suspension is pumped through a pipe 47 into the conveyor 10 to mingle with the incoming flakes, preferably in advance of the fall of such flakes into the main interior portion of desolventizer 14. Decanter 42 has sufficient capacity and the various pipes and other equipment and rate of operation of pump 46 are so proportioned that substantially clear solvent separates from the aqueous liquor and the solids fines, and rises to the liquid surface at which it overflows through line 44, for eventual reuse in the main extraction operation. Having inlet 43 below line 44 avoids the possibility of contamination of the substantially clear solvent by cross flow in decanter 42 of the solvent and aqueous phases. A vent 48 is provided in the top of decanter 42 to equalize pressures in the decanter and condenser 33.

Connected to the decanter 42, at an elevation somewhat below the liquid level established by the overflow pipe 44, in some instances a pipe 49 may be provided leading to the inlet side of a pump 50, the discharge side of which is connected through a pipe 51 to spray nozzles 52 disposed in the upper header 35 of the condenser. The pipe 49 enters the shell of the decanter at a level high enough to withdraw substantially clear solvent. This solvent, recirculated through the tubes of the condenser, increases the scrubbing of the vapors and particularly of the non-condensables passing through the outlet pipe 40. This recirculation is especially desirable where such non-condensables are present in substantial amounts. Further, it affords better flushing down of the condenser tubes and the bowl 36 at the base of the condenser, by condensed solvent. This solvent flows countercurrent to the vapors and gases as does solvent undergoing condensation in the condenser itself.

The aqueous part of the condensate and preferably a small portion of the solvent (sufficient to avoid the formation of an intermediate emulsion layer) are pumped through line 47 as aforesaid. Since the aqueous part contains the substantial portion, if not almost all, of the fines in the condensate from condenser 33, such fines are not lost but are returned to the remaining solids about to be processed in desolventizer 14.

The return of the aqueous part to the flakes as indicated increases their associated moisture so that in the desolventizing step the net moisture content of the flakes is unchanged.

Where the solvent is an alcohol or other material miscible with liquid water, there is no aqueous phase present in the decanter and the pump 46 withdraws a sludge or concentrate of settled fines in solvent from the bottom of the decanter 42. The solvent and fines concentrate is recycled to the desolventizer as previously described, the fines being reincorporated in the flakes or other type of particles, and eventually discharged through the valve 21; while the recycled solvent is re-evaporated and condensed. While this imposes a slightly greater evaporating load on the desolventizer, it becomes unnecessary to evaporate the solvent from the sludge in other apparatus and the net economy is somewhat higher, while at the same time the disposal problem is avoided and all solvent and fines are conserved.

It is to be understood that all vapor piping, as well as the domes 13 and 24 of the desolventizer, are steam-jacketed following known and accepted practices to avoid condensation of vapors prior to their entering the condenser 33.

Although I have illustrated and described but a preferred embodiment of this invention, it will be recognized that some changes may be made therein without departing from the spirit of the invention or the scope of the appended claims.

I claim:

1. In a desolventizing system for the treatment of solids remaining following the solvent extraction of extract from solid organic particles, the steps comprising, desolventizing said remaining solvents, passing the net vapors evolved in said desolventizing upwardly in a substantially vertical direction, condensing the condensable portions of said net vapors during such passage, returning the condensed portions of said net vapors in a direction countercurrent to and in contact with said net vapors, separating substantially clear solvent from said condensed portions, and recycling the remainder of said condensed portions to said remaining solids, whereby the efficiency of said condensing is maintained unimpaired, fines in said remainder of said condensed portions are returned to said remaining solids, and solvent is conserved.

2. In a desolventizing system for the treatment of solids remaining following the solvent extraction of extract from solid organic particles, the steps comprising, desolventizing said remaining solvents, passing the net vapors evolved in said desolventizing upwardly in a substantially vertical direction, condensing the condensable portions of said net vapors during such passage, returning the condensed portions of said net vapors in a direction countercurrent to and in contact with said net vapors, separating substantially clear solvent from said condensed portions, recycling at least a portion of said substantially clear solvent in a direction countercurrent to said net vapors during said condensing, and recycling the remainder of said condensed portions to said remaining solids, whereby the efficiency of said condensing is maintained unimpaired, fines in said remainder of said condensed portions are returned to said remaining solids, and solvent is conserved.

3. In a desolventizing system for the treatment of solids remaining following the solvent extraction of extract from solid organic particles, the steps comprising, desolventizing said remaining solids, condensing the condensable portions of the net vapors evolved in said desolventizing, moving said net vapors and said condensed portions in substantially vertical directions during said condensing, continuously contacting said net vapors and the condensed portions thereof during such movement to scrub said net vapors, separating substantially clear solvent from said condensed portions, and recycling the remainder of said condensed portions to said remaining solids in advance of said desolventizing, whereby the efficiency of said condensing is maintained unimpaired, fines in said remainder of said condensed portions are returned to said remaining solids, and solvent is conserved.

4. In a desolventizing system for the treatment of solids remaining following the solvent extraction of extract from solid organic particles, the steps comprising, feeding said remaining solids to a desolventizer, desolventizing said remaining solids in said desolventizer, passing the net vapors evolved in said desolventizing upwardly through a condensing zone having vertical condensing surfaces, condensing the condensable portions of said net vapors during such passage, returning the condensed portions of said net vapors in a direction countercurrent to and in contact with said net vapors, separating substantially clear solvent from said condensed portions, and recycling the remainder of said condensed portions to said remaining solids in advance of said desolventizing, whereby fines in said remainder are returned to said remaining solids, moisture is returned to said remaining solids to maintain the appropriate moisture content thereof and said condensing surfaces are continuously washed clean by said condensed portions.

5. In a desolventizing system for the treatment of solids remaining following the solvent extraction of oil from soybean flakes or the like, the steps comprising feeding said remaining solids to a desolventizer, desolventizing said remaining solvents in said desolventizer, passing the net vapors evolved in said desolventizing upwardly through a condensing zone having condensing surfaces at an angle to the horizontal, condensing the condensable portions of said net vapors during said passage, returning the condensed portions of said net vapors in a direction countercurrent to and in contact with said net vapors, continuously separating said condensed portions into a substantially clear solvent part and an aqueous part having an interface zone therebetween, removing said substantially clear solvent for reuse in said solvent extraction, removing said aqueous part and said interface zone, and recycling said aqueous part and said interface zone to said remaining solids, whereby fines in said aqueous part are returned to said remaining solids, moisture is returned to said remaining solids to maintain the appropriate moisture content thereof and said net vapors and condensing surfaces are continuously washed clean by said condensed portions.

6. In a desolventizing system for the treatment of solids remaining following the solvent extraction of extract from solid organic particles, apparatus comprising in combination, a desolventizer, means for feeding said remaining solids to said desolventizer, a condenser connected to said desolventizer and adapted to condense the condensable portions of the net vapors evolved in said desolventizer, a decanter connected to said condenser and adapted to separate solvent in substantially clear condition from the remainder of the condensate from said condenser, means for returning said substantially clear solvent for reuse in said solvent extraction, and means for returning said remainder of said condensate to said remaining solids, whereby fines in said remainder are returned to said remaining solids, moisture is returned to said remaining solids to maintain the appropriate moisture content thereof and said condensing surfaces are continuously washed clean by said condensed portions.

7. In a desolventizing system for the treatment of solids remaining following the solvent extraction of extract from solid organic particles, apparatus comprising in combination, a desolventizer, means for feeding said remaining solids to said desolventizer, a condenser connected to said desolventizer and adapted to condense the condensable portions of the net vapors evolved in said desolventizer, a decanter connected to said condenser and adapted to separate solvent in substantially clear condition from the remainder of the condensate from said condenser, means for recycling at least a portion of said substantially clear solvent to the top of said condenser and returning the balance of said substantially clear solvent for reuse in said solvent extraction, and means for returning said remainder of said condensate to said remaining solids, whereby fines in said remainder are returned to said remaining solids, moisture is returned to said remaining solids to maintain the appropriate moisture content thereof and said condensing surfaces are continuously washed clean by said condensed portions.

8. In a desolventizing system for the treatment of solids remaining following the solvent extraction of oil from soybean flakes or the like, apparatus comprises in combination, a desolventizer adapted to remove residual liquids in said remaining solids, means for feeding said remaining solids to said desolventizer, a condenser connected to said desolventizer and adapted to condense the condensable portions of the net vapors evolved in said desolventizer, said condenser having substantially vertical condensing surfaces, a non-condensable vapor outlet in said condenser, a decanter connected to said condenser and adapted to receive the condensate therefrom, said decanter being further adapted to separate said condensate into a substantially clear solvent part and fines-containing concentrate part, means for removing said substantially clear solvent from said decanter, means for removing said concentrate part from said decanter, said last-named means being connected to said means for feeding, whereby the condensing surfaces of said reflux condenser are maintained clean by the countercurrent flow of the condensed portions of said net vapors, and fines in said concentrate part are returned to said remaining solids.

HAL B. COATS.

References Cited in the file of this patent

UNITED STATES PATENTS

| Number | Name | Date |
|---|---|---|
| 1,151,597 | Johnson, Jr. | Aug. 31, 1915 |
| 1,721,686 | Boykin | July 23, 1929 |
| 2,079,280 | Couch | May 4, 1937 |
| 2,198,412 | McDonald | Apr. 23, 1940 |
| 2,310,680 | Dinley | Feb. 9, 1943 |
| 2,321,893 | Bimpson et al. | June 15, 1943 |
| 2,334,015 | Levine et al. | Nov. 9, 1943 |
| 2,382,944 | Porter | Aug. 14, 1945 |
| 2,453,859 | Pugh | Nov. 16, 1948 |
| 2,467,435 | Langhurst | Apr. 19, 1949 |
| 2,491,060 | Robinson | Dec. 13, 1949 |
| 2,567,179 | Bonotto | Sept. 11, 1951 |